(12) United States Patent
Azuma et al.

(10) Patent No.: US 9,588,236 B2
(45) Date of Patent: Mar. 7, 2017

(54) RADIOACTIVITY ANALYZING APPARATUS (71) Applicant: MITSUBISHI ELECTRIC CORPORATION, Chiyoda-ku (JP)

(72) Inventors: Tetsushi Azuma, Chiyoda-ku (JP); Masateru Hayashi, Chiyoda-ku (JP); Hiroshi Nishizawa, Chiyoda-ku (JP); Hajime Nakajima, Chiyoda-ku (JP); Kenji Inomata, Chiyoda-ku (JP); Masakazu Nakanishi, Chiyoda-ku (JP); Toshihide Aiba, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/419,588

(22) PCT Filed: Apr. 9, 2013

(86) PCT No.: PCT/JP2013/060750
§ 371 (c)(1),
(2) Date: Feb. 4, 2015

(87) PCT Pub. No.: WO2014/041836
PCT Pub. Date: Mar. 20, 2014

(65) Prior Publication Data
US 2015/0212214 A1 Jul. 30, 2015

(30) Foreign Application Priority Data
Sep. 12, 2012 (JP) .................... 2012-200808

(51) Int. Cl.
*G01T 1/20* (2006.01)
*G01T 1/202* (2006.01)
(Continued)

(52) U.S. Cl.
CPC .............. *G01T 1/202* (2013.01); *G01T 1/24* (2013.01); *G01T 7/005* (2013.01)

(58) Field of Classification Search
CPC ..... G01T 1/1642; G01T 1/208; G01T 1/1647; G01T 1/17; G01T 1/2985
See application file for complete search history.

(56) References Cited

U.S. PATENT DOCUMENTS 4,217,496 A * 8/1980 Daniels et al. ............... 250/369
4,394,574 A 7/1983 Grau et al.
(Continued)

FOREIGN PATENT DOCUMENTS

CN 85 1 06296 A 12/1986
EP 0 167 119 A2 1/1986
(Continued)

OTHER PUBLICATIONS

Bayesteh et al. "Diagnostics of Femtosecond Low-Charge Electron Bunches at REGAE", Proceedings of IPAC2011, San Sebastian, Spain p. 1192-1194.*

(Continued)

*Primary Examiner* — David Porta
*Assistant Examiner* — Mamadou Faye
(74) *Attorney, Agent, or Firm* — Oblon, McClelland, Maier & Neustadt, L.L.P.

(57) ABSTRACT

A radioactivity analyzing apparatus for analyzing a radionuclide contained in a sample material. The apparatus includes a radiation detector that detects a radiation to be detected emitted from the sample material and a radiation analyzer configured to analyze the radiation based on an output from the radiation detector. The radiation analyzer includes a pulse-height analyzer configured to extract a pulse-height distribution from a pulse signal being output from the radiation detector and depending on the radiation, (Continued)

an inverse-problem operator configured to perform an inverse-problem solution of the pulse-height distribution to extract an energy spectrum of the radiation, and a deterioration detector configured to determine a deterioration state of the radiation detector based on the extracted energy spectrum.

10 Claims, 10 Drawing Sheets

(51) Int. Cl.
  *G01T 7/00* (2006.01)
  *G01T 1/24* (2006.01)

(56) References Cited

U.S. PATENT DOCUMENTS

| | | | |
|---|---|---|---|
| 4,445,036 A * | 4/1984 | Selph | 250/370.05 |
| 7,180,055 B1 | 2/2007 | Kallenbach et al. | |
| 2004/0190679 A1 * | 9/2004 | Waggener et al. | 378/54 |
| 2005/0247881 A1 * | 11/2005 | Kobayashi et al. | 250/370.07 |
| 2009/0114826 A1 * | 5/2009 | Takahashi | G01T 1/2018 250/363.03 |
| 2009/0127468 A1 | 5/2009 | Fehrenbacher | |
| 2010/0061616 A1 * | 3/2010 | Tsubota et al. | 382/132 |
| 2010/0128852 A1 * | 5/2010 | Yamamoto | G01T 1/00 378/207 |
| 2011/0012012 A1 * | 1/2011 | Stein et al. | 250/252.1 |
| 2013/0032722 A1 * | 2/2013 | Szupryczynski et al. | 250/366 |
| 2013/0221193 A1 * | 8/2013 | Williams et al. | 250/206 |
| 2015/0117594 A1 * | 4/2015 | Pavlovich et al. | 378/5 |

FOREIGN PATENT DOCUMENTS

| | | |
|---|---|---|
| JP | 2004 12322 | 1/2004 |
| JP | 2006 234727 | 9/2006 |
| JP | 2008 545979 | 12/2008 |
| JP | 2010 82426 | 4/2010 |
| WO | WO 01/94977 A2 | 12/2001 |

OTHER PUBLICATIONS

English translation of International Preliminary Report on Patentability and Written Opinion issued Mar. 26, 2015 in PCT/JP2013/060750.

Knoll G. (translated by Itsuro Kimura et al.), "Radiation Detection and Measurement 8.2.2 Properties of Alkali Halide Scintillators", Nikkan Kogyo Shimbun Ltd., (2000), pp. 244-247.

International Search Report Issued May 14, 2013 in PCT/JP13/060750 Filed Apr. 9, 2013.

Extended European Search Report issued on Apr. 7, 2016 in European Patent Application No. 13837105-9.

Office Action issued Apr. 28, 2016 in Chinese Patent Application No. 201380046939.5 (with partial English translation).

* cited by examiner

| NATURAL RADIATION AND ITS ENERGY | | |
|---|---|---|
| 0.08 | MeV | : RADIATION FROM SHIELD MATERIAL OF LEAD (X-RAY) |
| 0.511 | MeV | : GAMMA-RAY YIELDED IN ANNIHILATION OF POSITRON FROM COSMIC RAY |
| 0.61, 1.13, 1.76 | MeV | : RADON-222 DISINTEGRATION PRODUCTS CONTAINED IN CONCRETE MATERIAL |
| 1.46 | MeV | : POTASSIUM -40 CONTAINED IN SOIL, GROUNDWATER, OR HUMAN BODY |
| 2.61 | MeV | : THALLIUM-208 CONTAINED IN ORE IN SOIL |

RADIOACTIVITY ANALYZING APPARATUS

TECHNICAL FIELD

The present invention relates to a radioactivity analyzing apparatus, and more specifically to an apparatus comprising a system for detecting a deterioration state of a radiation detector.

BACKGROUND ART

If a nuclear power plant has such a critical accident that radioactive materials are scattered to the environment, food, water and soil should be inspected for radioactive contamination. A radioactivity analyzing apparatus is adapted to detect a radiation energy and/or radiation intensity received from radionuclides in a sample such as food and to perform an identification and quantitative analysis thereof, which requires high accuracy and reliability.

Reference 1, for example, discloses a method for attaining a relatively good energy resolution by performing an unfolding solution method using a response function, which is a kind of an inverse-problem solution, thereby to identify a type of radionuclides of concern and estimate a contribution of each radionuclide over a total dose of radiation.

Reference 2 discloses a method for compensating a blur appeared in a radiological image by performing an unfolding solution method using one of response functions selected in accordance with energy.

PRIOR ART DOCUMENTS

Patent Documents

Patent Document 1: JP 2008-545979 A
Patent Document 2: JP 2006-234727 A

Non-Patent Documents

Non-patent Document 1: G. F. Knoll (translated by Itsuro Kimura and Eiji Sakai), "Radiation Detection and Measurement 8.2.2 Properties of Alkali Halide Scintillators", Nikkan Kogyo Shimbun Ltd., p 244-247

SUMMARY OF THE INVENTION

Problems to be Solved by the Invention

In general, a conventional radioactivity analyzing apparatus decreases in energy resolution and detection efficiency due to aging deterioration of the radiation detector, resulting in a poor accuracy to identify and quantify the radionuclide.

There is, however, no suitable way to easily determine a deterioration state of the radiation detector, causing a widespread TBM (Time Based Maintenance) where the radiation detector is periodically replaced based on the expected time of its breakdown or critical deterioration, which prevented CBM (Condition Based Maintenance) where life time of the radiation detector until required to be replaced is expected from the deterioration state thereof.

Thus, a user cannot replace the radiation detector at a suitable time depending on its deterioration state. As such, the radiation detector will be replaced until required to be replaced, resulting in more replacement frequency, which causes high cost burden on a user. Further, the radiation detector possibly substantially deteriorates due to the usage environment before the periodical replacement, resulting in inevitable poorer detection accuracy.

It is an object of the present invention to provide a radioactivity analyzing apparatus including a system for easily estimating the deterioration state of the radiation detector.

Means for Solving the Problems

To achieve the above object, in one aspect of the present invention, there is provided a radioactivity analyzing apparatus for analyzing a radionuclide contained in a sample material. The apparatus may comprise a radiation detector that detects a radiation to be detected emitted from a sample material and a radiation analyzer configured to analyze the radiation based on an output from the radiation detector. The radiation analyzer may include a pulse-height analyzer configured to extract a pulse-height distribution from a pulse signal depending on the radiation, the pulse signal being output from the radiation detector. The radiation analyzer may further include an inverse-problem operator configured to perform an inverse-problem solution of the pulse-height distribution to extract an energy spectrum of the radiation. The radiation analyzer may further include a deterioration detector configured to determine a deterioration state of the radiation detector based on the energy spectrum.

In one aspect of the present invention, preferably, the deterioration detector may determine the deterioration state by analyzing noise appeared in the energy spectrum.

In one aspect of the present invention, preferably, the deterioration detector may determine the deterioration state based on a noise-generation ratio in the extracted energy spectrum.

In one aspect of the present invention, preferably, the radiation analyzer may further include an auto-compensator for compensating a variation of an amplification factor in the pulse signal, wherein the auto-compensator shifts the energy spectrum along its energy axis as a function of an amplifying-factor variation calculated based on the pulse-height distribution.

In one aspect of the present invention, preferably, the radiation analyzer may further include a response-function operator configured to generate a response function of the radiation detector which is used for the inverse-problem solution.

In one aspect of the present invention, preferably, the deterioration detector may determine a deterioration level in compliance with the deterioration state of the radiation detector, and wherein the response-function operator generates the response function depending on the deterioration level.

In one aspect of the present invention, preferably, the radiation detector may be a scintillation detector including a radiation-detection element which receives the radiation to generate a scintillation light and a photoelectric-conversion element in which photoelectric conversion is performed on the scintillation light. The response-function operator may generate the response function based on a radiation behavior analysis for the radiation after being emitted from the radionuclide and before being irradiated to the radiation-detection element to apply energy thereto, and/or, a combination of the radiation behavior analysis and a light behavior analysis for the scintillation light after being generated at the radiation-detection element before reaching the photoelectric-conversion element to get converted to energy.

In one aspect of the present invention, preferably, the radiation detector may further include a radiation-detection element which receives the radiation to generate charge carriers by the ionization effect. The response-function operator may generate the response function based on a radiation behavior analysis for the radiation after being emitted from the radionuclide and before being irradiated to the radiation-detection element to apply energy thereto, and/or, a combination of the radiation behavior analysis and a generation process analysis for the charge carriers in the radiation-detection element.

In one aspect of the present invention, preferably, a connection between the pulse-height distribution and the radiation energy may be calibrated based on natural radiation detected by the radiation detector In one aspect of the present invention, preferably, the radiation analyzer may further include a quantitative radionuclide analyzer configured to perform an identification and/or quantitative analysis of a radionuclide contained in the sample material based on the output from the inverse-problem operator.

In one aspect of the present invention, preferably, the radioactivity analyzing apparatus may further comprise a display for indicating an exchange time when the radiation detector should be replaced.

Effects of the Invention

According to the present invention, the combination of the inverse-problem operator and the deterioration detector enables the deterioration state of the radiation detector to be easily estimated or determined. This enables a user to replace the radiation detector at a suitable time depending on its deterioration stage, which results in cost reduction.

In addition, the deterioration state of the radiation detector is determined with high accuracy, allowing the user to use the radiation detector without deterioration, thereby ensuring high analysis accuracy.

BRIEF DESCRIPTION OF THE DRAWINGS

FIG. 7A-7C are charts illustrating shifting in an energy spectrum performed by an auto-compensator. FIG. 7A-7C correspond to initial state, 10th day, 20th day of FIG. 6, respectively.

EMBODIMENTS OF THE INVENTION

First Embodiment

Figure 1:
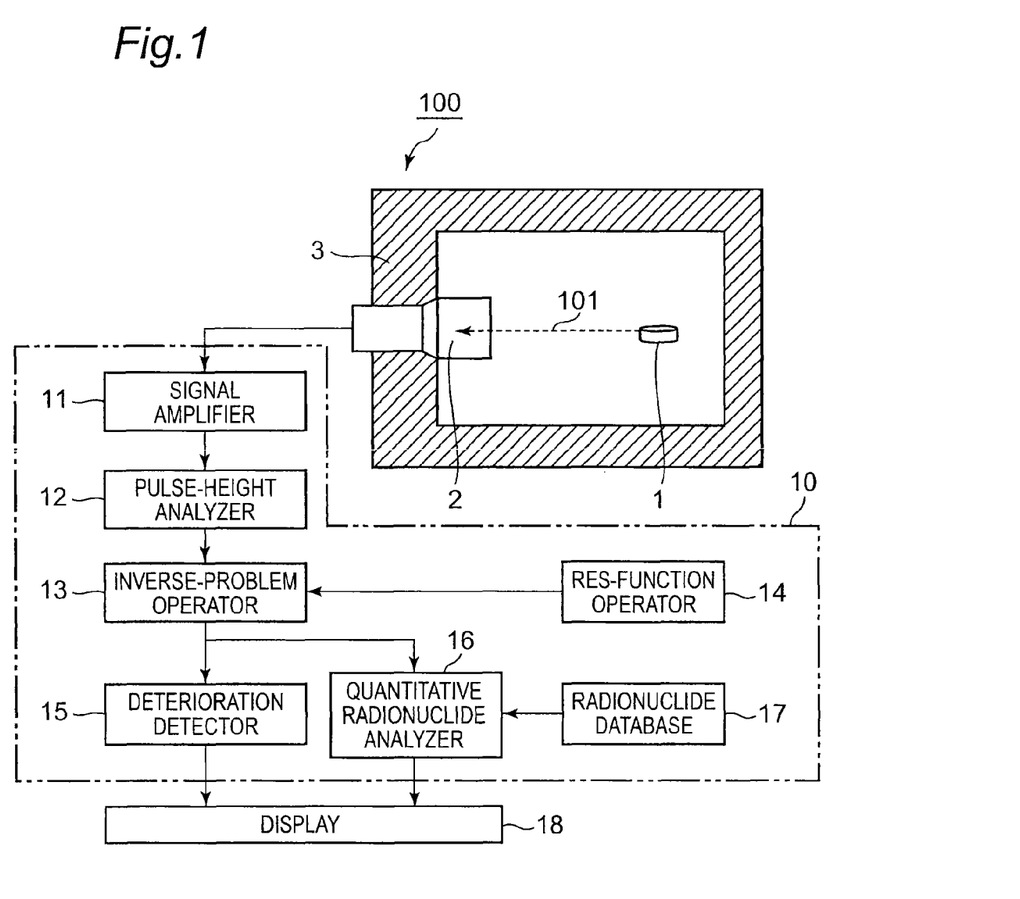
FIG. 1 is a schematic illustration of a radioactivity analyzing apparatus according to the first embodiment of the present invention.

FIG. 1 is a schematic illustration of a radioactivity analyzing apparatus according to the first embodiment of the present invention. A radiation analyzing apparatus 100 includes a radiation detector 2 that detects a radiation 101 (radiation or radioactivity to be detected) emitted from a sample material 1, a shield body 3 for receiving the sample material 1, a radiation analyzer 10 for analyzing an output from the radiation detector 2, and a display 18 such as a liquid crystal display.

The radiation analyzer 10 includes a signal amplifier 11, a pulse-height analyzer 12, an inverse-problem operator 13, a response-function operator 14, a deterioration detector 15, a quantitative radionuclide analyzer 16, and a radionuclide database 17.

The signal amplifier 11 may include a pre-amplifier and a waveform-shaping amplifier. The pulse-height analyzer 12 may include a multichannel pulse-height analyzer. The inverse-problem operator 13, the response-function operator 14, the deterioration detector 15, the quantitative radionuclide analyzer 16, and the radionuclide database 17 may be composed of, for example, one or more microprocessors.

In general, the radiation detector 2 includes a radiation-detection element for detecting the radiation 101. In case where the radiation detector 2 is in a form of a scintillation detector, the radiation-detection element may be composed of a scintillation material. The scintillation material may have one or more constituent molecules which emit fluorescence (scintillation light) upon return to the ground state after excitation by energy imparted from a radiation. This energy is assigned by interaction among photoelectric absorption, Compton Effect, and electron-pair production occurred between a radiation and a scintillation material. Thus, the incidence of the radiation 101 emitted from the sample material 1 to the scintillation detector generates a scintillation light having a wavelength unique to the scintillation material. The scintillation detector may include a photocathode (photoelectric-conversion element) for performing photoelectric conversion of the generated scintillation light to output converted charges as a pulse signal.

In case where the radiation detector 2 is in a form of a semiconductor detector, s-type and p-type semiconductors which each form an electrode receive a reverse-bias voltage applied therebetween, which in turn forms a depletion layer in between the semiconductors, performing a function as a radiation-detection element. The incidence of the radiation 101 emitted from the sample material 1 to the semiconductor detector generates electron-pairs due to an ionization effect caused by the radiation. Then, electrons and holes are moved toward opposite electrodes, resulting in a pulse signal output from the semiconductor detector.

The shield body 3 may be made of a material having a high radioactivity-impermeability, such as lead or iron, preferably lead. The shield body 3 may include a shield core made of copper, for example. The shield body 3 shields natural radiations. Natural radiations include one emitted from natural radionuclides in a circumference and one derived from cosmic rays. Assuming that the shield body 3 is made of lead, the shield body 3 preferably has a thickness equal to or greater than about 15 cm so as to effectively shield some natural radiations having substantially high energy. This allows the radiation detector 2 to selectively detect radiation 101 from the sample material 1 in an effective manner. The shield body 3 further includes an access port used for replacing the sample material 1 and an aperture for receiving the radiation detector 2 positioned therethrough.

Now operation of the radiation analyzer 10 will be described below. The signal amplifier 11 is designed to amplify by a predetermined amplification factor and/or shape the pulse signal output from radiation detector 2 or the photoelectric-conversion element.

The pulse-height analyzer 12 is designed to determine a pulse height for the signal output from the signal amplifier 11 to extract a pulse-height distribution. Specifically, the pulse-height analyzer 12 counts the number of pulse height having a peak as much as or greater than a predetermined value and performs A/D conversion of the peak value to output.

The extracted pulse-height distribution may be influenced not only by direct contribution of the radiation 101 from the sample material 1 but also by interaction of the radiation 101 with the radiation detector 2 and/or the shield body 3, such as photoelectric absorption, Compton effect and electron-pair production. This causes a total absorption peak, a Compton continuum, an escape peak appeared in the extracted pulse-height distribution. While the radiation 101 from the sample material 1 irradiates the radiation detector 2 so that the imparted photon energy is converted to electron energy, a statistical broadening specific to the radiation detector 2 is added to the pulse-height distribution in a form of a statistical dispersion in a charge amount generated by the energy imparted radiation detector 2. This decreases an energy resolution, which can be defined as a half-width of the peak appeared in the pulse-height distribution, resulting in a poor accuracy to identify and quantify the radionuclide in the sample material 1.

The inverse-problem operator 13 is designed to receive signals output from the pulse-height analyzer 12, and calls a response function generated or computed by the response-function operator 14 to perform an inverse-problem solution to the pulse-height distribution with use of the response function. Thus, letting S be an energy spectrum excluding the influence by the interaction of the radiation 101, the pulse-height distribution M, the response function R, and the energy spectrum S have a relationship expressed in Formula 1 as below. The inverse-problem operator 13 extracts the energy spectrum S with Formula 2 listed below, which represents the reverse conversion of Formula 1. It should be noted that the denotation of $R^{-1}$ in Function 2 represents an inverse matrix of the response function.

$$M = R \cdot S \quad \text{(Formula 1)}$$

$$S = R^{-1} \cdot M \quad \text{(Formula 2)}$$

The solution of the Function 2 extracts the energy spectrum S from the pulse-height distribution M generated solely by the radiation 101 from the sample material 1, in which the influence of the interaction and the above-mentioned statistical dispersion are eliminated. By means of such solution, the energy spectrum S of the radiation 101 can accurately be detected so that the radionuclide contained in the sample material 1 is identified and quantified with an improved accuracy. The extracted energy spectrum is transmitted to the deterioration detector 15 and the quantitative radionuclide analyzer 16.

The response-function operator 14 is designed to generate the response function of the radiation detector 2. The response-function operator 14 may include a database for storing the generated response function. The database may be structured in a memory connected to the response-function operator 14 such as in a form of a microprocessor. The response-function operator 14 outputs the generated response function in response to the request from the inverse-problem operator 13.

A response function is indicative of a pulse-height distribution which would be output by the radiation detector 2 upon receiving the monoenergetic radiation. The response function may be determined based on a type, a dimension and/or a shape of the radiation detector 2, and/or a measurement system on which the detector 2 is disposed. Monte Carlo transport computational code for a radiation behavior analysis such as EGS5 (Electron Gamma Shower ver.5) may be used to generate a response function irrelevant to the energy resolution specific to the detector 2. Alternatively, the response function may empirically be achieved.

A plurality of response functions are required, which correspond to various energy in a range between the minimum energy and the maximum energy possibly detected by the radiation detector 2 in the system. In general, the maximum energy of a response function is in a range between about 2 MeV and about 3 MeV. An energy width, which is defined by dividing the full energy range between the minimum energy and the maximum energy by any natural number, is equivalent to the energy resolution in the energy spectrum obtained by the inverse-problem solution. Thus, if the response function covers the range between the minimum energy of 0 MeV and the maximum energy of 3 MeV, which is divided by the number of 300, then the energy width is set to 10 keV and thus the energy resolution in the energy spectrum obtained by the inverse-problem operator 13 is also set to 10 keV.

In the first embodiment, the radiation behavior analysis using EGS5 is performed in cooperation with the light behavior analysis for the scintillation light generated and converted to electrons in the radiation detector 2, allowing the response-function operator 14 to generate the response function in compliance with the energy resolution specific to the detector 2.

In case where the radiation detector 2 is in a form of a scintillation detector, for example, the energy resolution specific to the detector 2 is determined by the amount of charges generated by photoelectric conversion of the scintillation light. In general, the radiation detector 2 has larger amount of charges, which reduces the statistical dispersion of the pulse-height distribution, thereby to improve the energy resolution.

The radiation behavior analysis according to the first embodiment will be made for a behavior of the radiation after being emitted from the radionuclide and before being irradiated to the radiation-detection element of the radiation detector 2 to apply energy thereto. The radiation behavior analysis is firstly performed to calculate an amount of energy loss and/or energy absorption due to interactions such as photoelectric absorption, Compton effect and electron-pair production occurred in the sample material. The radiation from the radionuclide may exponentially decay in the sample material. The exponent of the decay may be determined based on the interaction between the radiation and the constituent material of the sample material 1.

The radiation emitted from the sample material 1 may behave in different ways, i.e., (1) some directly impinge on the radiation-detection element to apply all of the radiation energy thereto at a time, (2) some are scattered, reflected and/or absorbed before impinging on the radiation-detection element, and (3) the other impinge on the radiation-detection element to apply a part of the radiation energy thereto but scatter corresponding to the remaining the radiation energy, emitting outside of the radiation-detection element. Those radiations (1) through (3) are appeared at a predetermined rates or probability. Thus, the radiation behavior analysis is secondary performed to compute the interaction between the radiation and the shield body and the interaction between the radiation and each optical material constituting the radiation detector 2.

In the light behavior analysis, the behavior of the scintillation light is analyzed after being generated at the radiation-detection element before reaching the photoelectric-conversion element to output converted charges. In this analysis, in particular, an energy loss due to decay, scattering, reflection and/or absorption occurred during the transmission of the scintillation light is calculated based on the optical property of the constituent material of the radiation detector 2.

If the radiation detector is arranged to output a part of charge carriers, i.e. electron-hole pairs generated by the ionization effect of radiation, as the semiconductor detector, the response function is generated by combining the radiation behavior analysis as described above with another analysis for a generation process of the charge carriers in the radiation-detection element. The another analysis may be intended to calculate, in particular, an energy loss due to recombination of the generated charge carriers during the movement to the electrode.

The quantitative radionuclide analyzer 16 is designed to retrieve data specific to a radionuclide stored in the radionuclide database 17 to perform the identification and quantitative analysis of the radionuclide based on the energy spectrum output from the inverse-problem operator 13. The identification and quantitative analysis of the radionuclide are performed by determining count number belonging to the energy region corresponding to data retrieved from the radionuclide database 17.

The radionuclide database 17 stores data about radiation energy from a radionuclide and an emission rate. When the radionuclide is cesium-137, for example, gamma-ray energy of 662 keV and the emission rate of 85% are stored in the database 17.

Figure 2A:
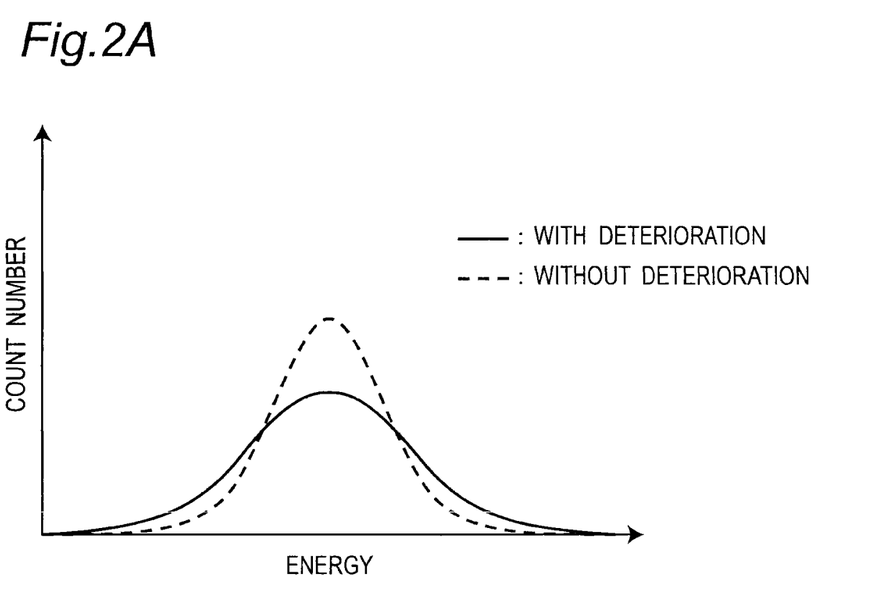
FIG. 2A is a graph illustrating the extracted pulse-height distribution which may be varied due to deterioration of radiation detector.
Figure 2B:
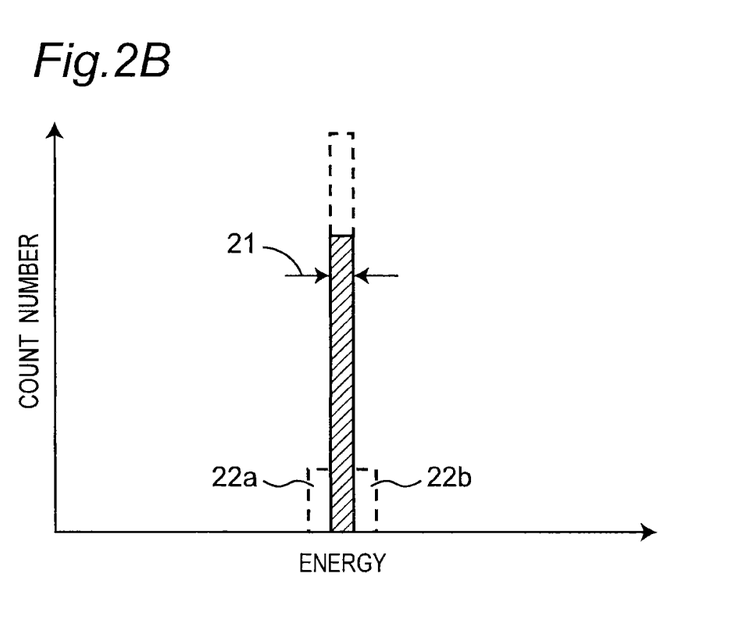
FIG. 2B is a chart illustrating a result of the inverse-problem solution to the pulse-height distribution of FIG. 2A FIGS. 3A-3C are charts of the pulse-height distribution, illustrating an exemplary method for determining the noise integration range.

When the extracted energy spectrum has the energy resolution of 10 keV, the gamma-ray having 662 keV emitted from cesium-137 is detected and counted in the particular range between 660 keV and 670 keV. Thus, the radionuclide can be identified by comparing the particular energy range (between 660 keV and 670 keV) with the energy data of cesium-137 (662 keV) retrieved from the radionuclide database 17. Also, the radionuclide can quantitatively be analyzed in accordance with data including the count number in the particular range and the emission rate retrieved from the radionuclide database 17. The analysis made by the quantitative radionuclide analyzer 16, i.e., identification and quantitative analysis of the radionuclide are transmitted to the display FIG. 2A is a graph illustrating the extracted pulse-height distribution which may be varied due to deterioration of radiation detector, FIG. 2B is a chart illustrating a result of the inverse-problem solution to the pulse-height distribution of FIG. 2A. In FIGS. 2A and 2B, the solid and dashed lines show plots for the radiation detector 2 with and without deterioration, respectively. It is generally known that the radiation detector is subject to deterioration depending on a type of the detectors and that such a deterioration decreases an energy resolution and/or a detection efficiency specific to the detector. Such deterioration basically develops over time, but may be accelerated by the usage environment.

The radiation detector 2 is, for example, in a form of a NaI(Tl) scintillation detector incorporating a crystal of thallium doped sodium iodide NaI(Tl) which is susceptive with moisture in the air to cause color change or tarnish and/or deliquescence of the radiation-detection element. This hinders the scintillation light to reach the photoelectric-conversion element, reducing an amount of electrons. As described above, larger amount of electrons produced by the photo-electrical conversion contributes higher energy resolution of the radiation detector 2. Thus, as the amount of light to be converted is decreased in response to the deterioration of the radiation detector 2, the pulse-height distribution has a poorer energy resolution than that without deterioration as illustrated in FIG. 2A.

When the radiation detector 2 deteriorates to some extent, it is difficult to detect the radiation in an accurate manner. For this reason, the deterioration detector 15 is arranged to detect how the radiation detector 2 is deteriorated based on the energy spectrum extracted by the inverse-problem operator 13 and is arranged to determine an exchange time when the detector 2 should be replaced as necessary.

The inverse-problem solution of the pulse-height distribution extracted from the output from the deteriorated radiation detector 2 results in some noises 22a and 22b appeared in the energy spectral at opposite sides of the main energy region 21 in interest as shown in FIG. 2B.

The inverse-problem operator 13 applies the response function for the radiation detector 2 without deterioration, i.e. the intact radiation detector, to the pulse-height distribution to perform the inverse-problem solution for the radiation detector 2 in an accurate manner, which shows no noise appeared at opposite sides of the energy region in interest in the energy spectrum. Thus, this means that the noises 22a and 22b appeared in the pulse-height distribution is caused solely by the deterioration of the radiation detector 2. Also more noises appeared in the pulse-height distribution means the radiation detector further having been deteriorated.

In order to evaluate how the radiation detector is deteriorated with a parameter of the amount of the appeared noises, it is necessary to quantify the noises, which in turn, requires determining a range for integration across the noises in energy spectral.

Figure 3A:
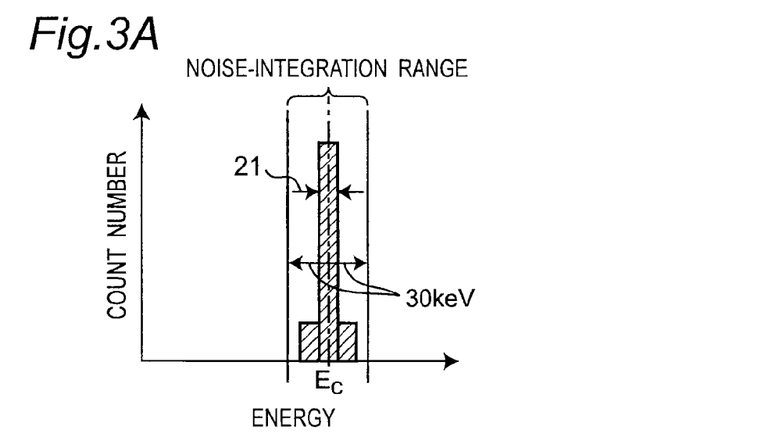
Figure 3B:
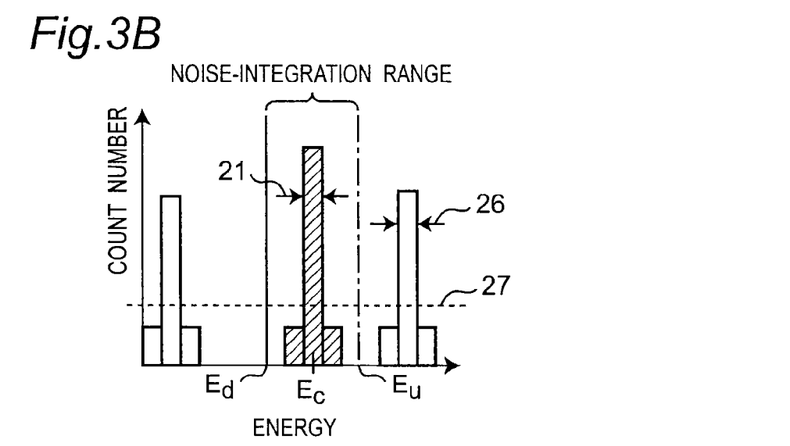
Figure 3C:
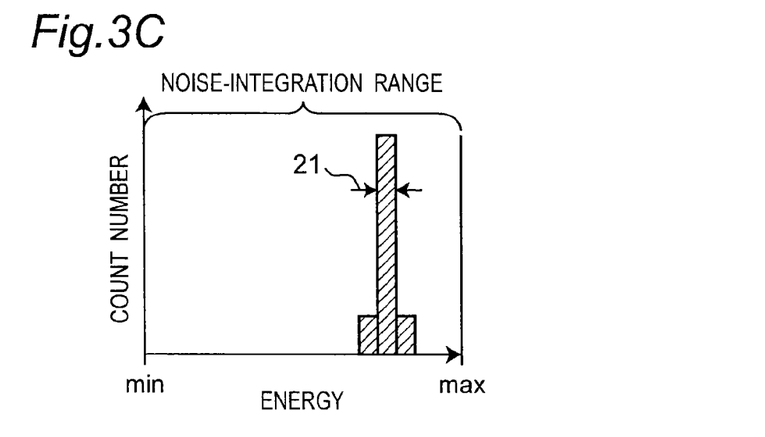

FIGS. 3A-3C are graphs of the pulse-height distribution, illustrating an exemplary method for determining the noise integration range. The noise integration range may be defined as one having a central energy $E_c$ in the energy spectrum of interest and covering predetermined sub-ranges, e.g. within ±30 keV, as illustrated in FIG. 3A. The predetermined sub-range may be determined based on properties of the radiation detector 2, the signal amplifier 11, and/or the pulse-height analyzer 12.

If the radiation detector 2 detects a plural sets of energy regions each having the peak radiation energy as shown in FIG. 3B, the upper limit $E_u$ of the noise integration range may be a midpoint of the central energy $E_c$ of the energy region of interest 21 and a central energy of another energy region 26 having a count number more than or equal to a predetermined threshold value (as indicated by reference numeral 27 in FIG. 3B). If there are some options for the energy region 26, one closest to the energy region of interest 21 may be employed as the energy region 26. The lowermost energy $E_d$ may be determined so that the central energy $E_c$ is located on a midpoint between the uppermost energy $E_u$ and lowermost energy $E_d$. Alternatively, it is feasible to firstly define the lower limit $E_d$ and then to determine the upper limit $E_u$ as above.

If the radiation detector 2 substantially detects a single set of the energy regions in interest as shown in FIG. 3C, the noise integration range may be defined as a full energy range detectable by the detector 2.

A noise-generation ratio is defined herein as a ratio of the integrated count number of noise calculated in the way illustrated in FIGS. 3A-3C to the count number in the energy region of interest.

Then, the calculated noise-generation ratio is compared to a predetermined deteriorating level and a nominal life time of the radiation detector 2 until required to be replaced. For example, the deteriorating level may be divided into 4 stages as shown in below Table 1. The predetermined deterioration stages may be sequential and the life time of the radiation detector 2 until required to be replaced may be continuous in accordance with the deterioration stages. Alternatively, the predetermined deterioration stages may be set either one of two levels (0 or 1), and the display 18 may simply indicate Yes (required to be replaced) or No (not required to be replaced).

TABLE 1

| noise-generation ratio | deterioration level | life time until being required to be replaced |
|---|---|---|
| from 0% to 10% | 0 | 1 year |
| from 10% to 60% | 1 | 3 months |
| from 60% to 100% | 2 | 1 months |
| 100% or more | 3 | immediate replacement |

In accordance with the analysis of the radiation analyzer 10 as described above, the display 18 indicates the deterioration level and the life time of the radiation detector 2 from the deterioration detector 15 and also the identification and the quantitative analysis of the radionuclide from the quantitative radionuclide analyzer 16.

According to the radioactivity analyzing apparatus 100 of the first embodiment, the combination of the inverse-problem operator 13 and the deterioration detector 15 enables the deterioration factor of the radiation detector 2 to be solely easily detected with its specific property being eliminated based on, for example, the amount of noise appeared in the energy spectrum extracted by the inverse-problem solution. This in turn enables the extent of deterioration as the deterioration level to be determined, thereby easily estimating the deterioration state of the detector 2. Thus, the user can replace the radiation detector 2 at a suitable time and thus in a cost-effective manner.

The radiation detector 2 may substantially deteriorate depending on the usage environment even before the typical or nominal life time. When the radiation detector 2 may be in a form of the above-mentioned NaI(Tl) scintillation detector, it is susceptible to an atmosphere in high temperature and/or high humidity, resulting in the color change and/or deliquescence of the scintillation crystal. Conventionally, it was difficult to determine the deterioration in detection accuracy of the radiation detector prior to regular replacement thereof. However, according to the radioactivity analyzing apparatus 100, a user is informed of the accurate deterioration state of the radiation detector 2 so as to avoid using the deteriorated radiation detector 2, thereby ensuring high accuracy in the radioactive analysis.

Further, in the first embodiment, the radiation behavior analysis by means of EGS5, etc. is used in cooperation with the light behavior analysis, resulting in the response function in compliance with the energy resolution specific to the radiation detector 2. This adapts the response function to the extracted pulse-height distribution in its shape, thereby improving the analysis accuracy and/or precision in the radioactive analysis.

Second Embodiment

Figure 4:
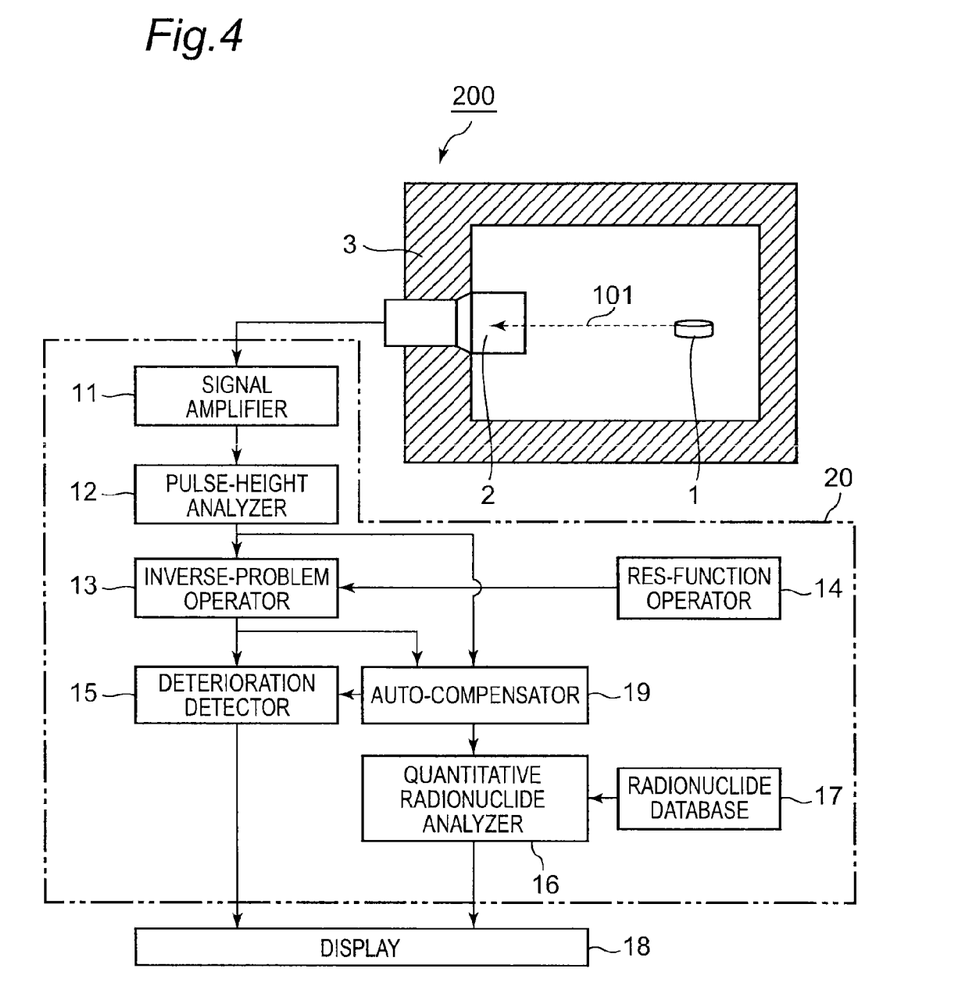
FIG. 4 is a schematic illustration of a radioactivity analyzing apparatus according to the second embodiment of the present invention.

FIG. 4 is a schematic illustration of a radioactivity analyzing apparatus according to the second embodiment of the present invention. The radioactivity analyzing apparatus 200 has the same elements as the radioactivity analyzing apparatus 100 except that the radiation analyzer 20 includes an auto-compensator 19. The auto-compensator 19 is arranged to compensate for variations in a signal amplifying factor, the variations being generated in the pulse signal output from the radiation analyzer 20 due to its aging deterioration. The auto-compensator 19 may be composed of, for example, one or more microprocessors.

As shown in FIG. 4, the auto-compensator 19 receives outputs from the pulse-height analyzer 12 and the inverse-problem operator 13 and transmits the compensated energy spectrum to the deterioration detector 15 and the quantitative radionuclide analyzer 16.

In general, when the radiation detector 2 is subject to aging deterioration or fatigue and/or a large temperature change of an ambient environment or instruments, the radiation detector 2 outputs a varied signal, resulting in a variation of the signal amplifying factor of the pulse signal.

Further, a measurement of a material for calibration which emits a radiation of a given energy is generally performed using the radiation detector 2 before its practical use, followed by an energy calibration to make a connection between the measured pulse height and the given radiation energy.

When the signal amplifying factor of the pulse signal is varied due to aging deterioration of the radiation detector 2, the connection as described above is varied from one indicated in FIG. 5 by the solid line 23, which is a predetermined connection of the energy calibration, to one indicated by the dashed lines 24a and 24b in FIG. 5.

Figure 5:
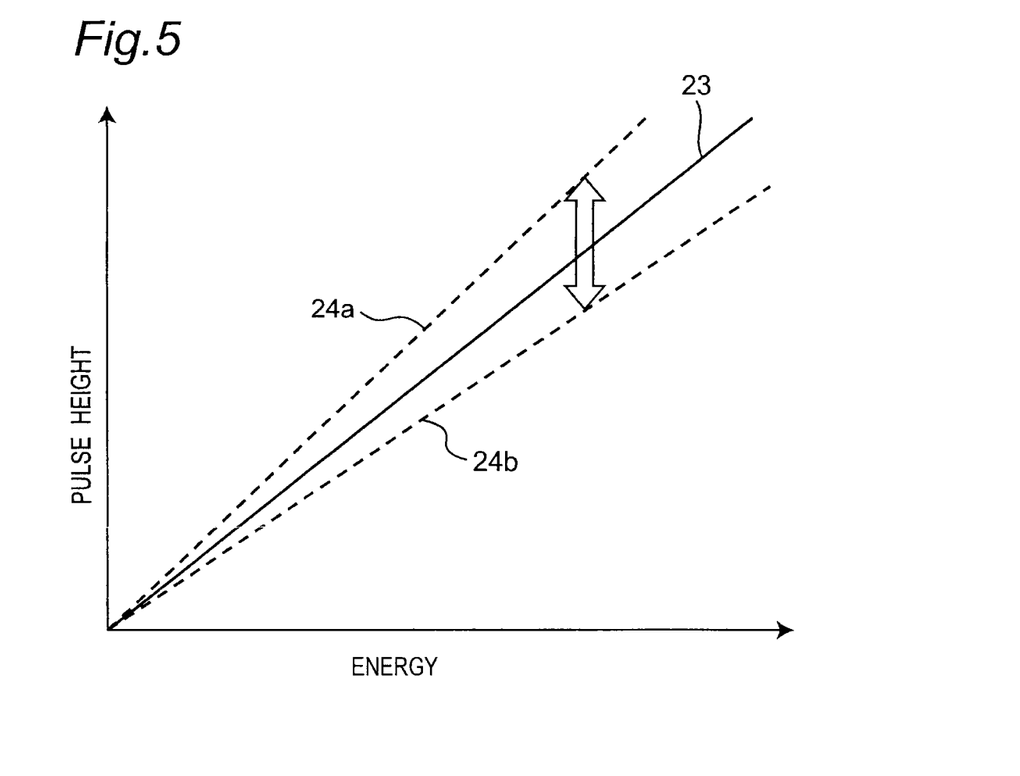
FIG. 5 is a graph illustrating a variation of an amplification factor of a pulse signal due to aging deterioration.

An amplifying-factor variation is defined herein as a ratio of an energy with the varied signal amplifying factor to an innate radiation energy, i.e. the given energy as mentioned above. The amplifying-factor variation is a quantified variation in the amplifying factor of the pulse signal due to aging deterioration. If the amplifying factor has not gone through aging variation, the amplifying-factor variation is equal to 1.

The auto-compensator 19 is arranged to generate a connection between the pulse height and the radiation energy based on the pulse-height distribution extracted by the pulse-height analyzer 12 during use of the radiation detector 2 to calculate the above mentioned amplifying-factor variation.

Figure 6:
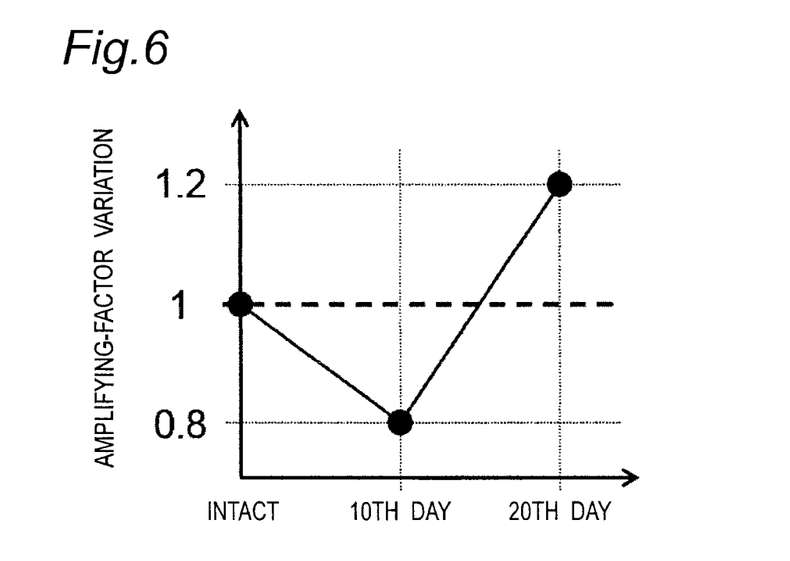
FIG. 6 is a graph illustrating an exemplary time-dependent change of an amplifying-factor variation.

FIG. 6 is a graph illustrating a variation of the amplifying-factor variation during twenty-day measurement. The dashed line in the figure represents no variation in the amplifying factor for 20 days, while the solid line a variation in the amplifying factor; 80% on the tenth day and 120% on the twentieth day.

Figure 7A:
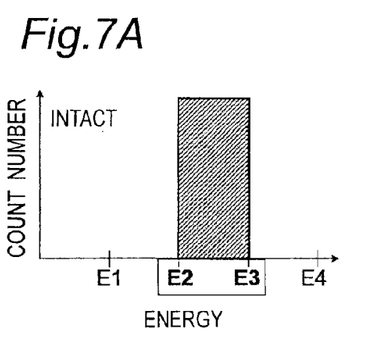
Figure 7B:
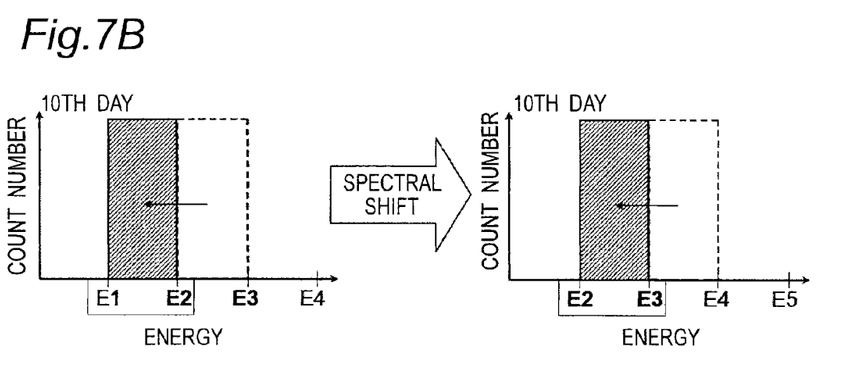
Figure 7C:
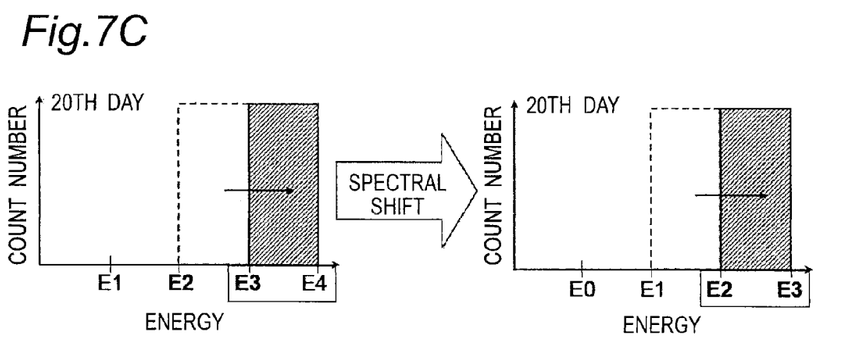

FIG. 7A-7C are charts illustrating shifting in an energy spectrum performed by the auto-compensator. Assuming that a radiation having a given energy is detected in energy region E2-E3 in FIG. 7A using a radiation detector without a variation in the amplifying factor, i.e. having the amplifying-factor variation of 1. When the amplifying factor varies as indicated by the dashed lines 24a and 24b in FIG. 5, the radiation having the given energy is no longer detected in the region E2-E3 but detected in a wrong or different energy region. The amplifying-factor variations of tenth and twentieth days of FIG. 6 may correspond to the wrong energy regions E1-E2 and E3-E4 in the left side of FIG. 7B-7C, respectively.

The auto-compensator 19 shifts the energy spectrum along the energy axis using the amplifying-factor variation. The radiation of the given energy is detected not in the wrong energy region E1-E2 and E3-E4 shown in the left side of FIG. 7B-7C, but both in the proper energy region E2-E3. The algorithm to shift the energy spectrum may include the division of numerical data on the energy axis of the energy spectrum, which is the output from the inverse-problem operator 13, by the amplifying-factor variation calculated by the auto-compensator 19.

In the second embodiment, the deterioration detector 15 executes the same processing as that of the first embodiment, i.e. computes a deterioration level of the radiation detector 2, but based on the energy spectrum shifted by the auto-compensator 19. The quantitative radionuclide analyzer 16 performs the identification and quantitative analysis of the radionuclide contained in the sample material 1 as described in the first embodiment.

The auto-compensator 19 may determine a shift amount in the compensated energy spectrum along the energy axis. The compensated energy spectrum may be output together with the shift amount from the auto-compensator 19 to the deterioration detector 15, which in turn allows the deterioration detector 15 to compute the deterioration level based on the shift amount. Alternatively, the deterioration detector 15 may be arranged to determine the shift amount.

According to the radioactivity analyzing apparatus 200 of the second embodiment, where the amplifying-factor variation is calculated by the auto-compensator 19 based on the extracted energy spectrum and it is automatically shifted along the energy axis based on the amplifying-factor variation, the following advantage is achieved over the apparatus 100 of the first embodiment: even though the radiation detector 2 with aging deterioration varies the signal amplifying factor, high analysis accuracy is ensured in the computation of the deterioration level by the deterioration detector 15 and the identification and quantitative analysis of the radionuclide by the quantitative radionuclide analyzer 16.

Further, a conventional radiation detector required a periodical inspection and/or calibration several times per year so as to suppress the variation of the signal amplifying factor due to aging deterioration. For the apparatus 200 of the second embodiment, the energy spectrum is automatically shifted depending on the usage of the radiation detector 2 by the auto-compensator 19. This eliminates unnecessary inspections on the radiation detector without aging deterioration, thereby reducing cost burden on users.

Moreover, calibration error due to human error conventionally could be invited in the calibration process. On the other hand, the calibration process in the apparatus 200 of the second embodiment is automatically performed, which lessens the occurrence rate of such a calibration error. Further, the calibration process can be performed without any extra apparatuses for the process.

Third Embodiment

Figure 8:
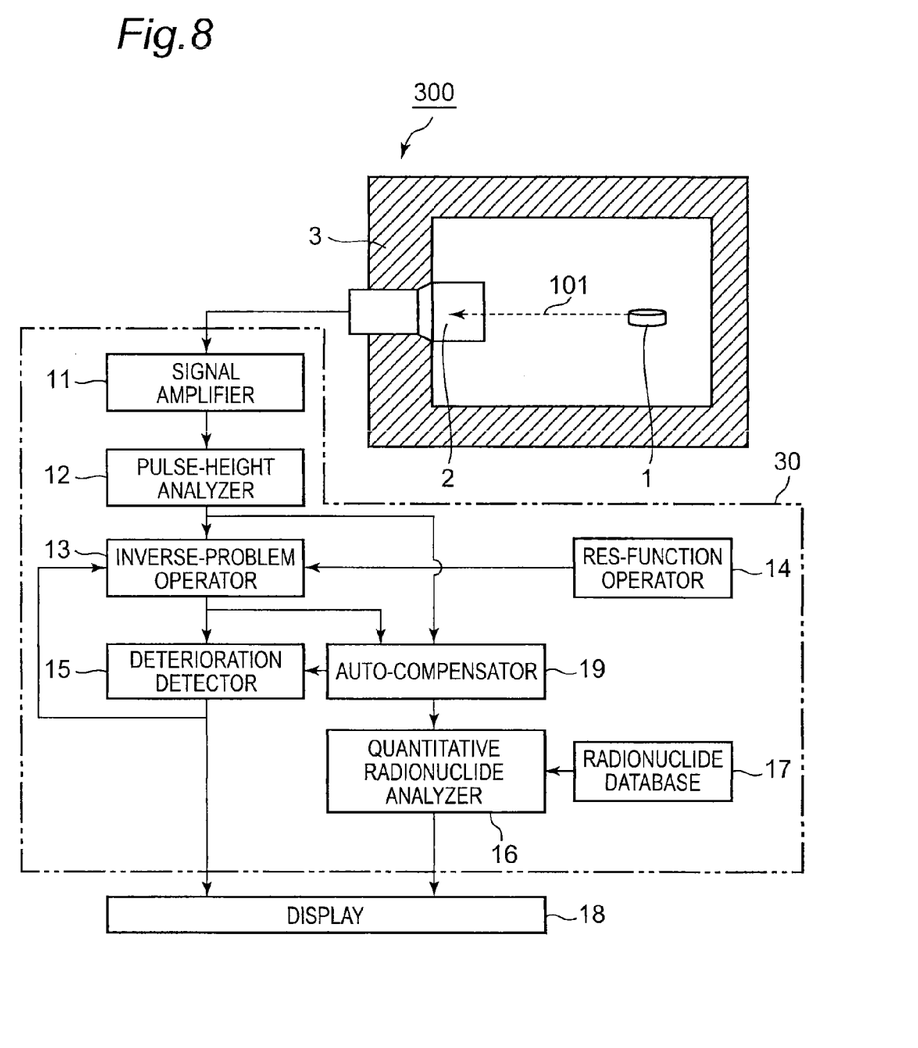
FIG. 8 is a schematic illustration of a radioactivity analyzing apparatus according to the third embodiment of the present invention.

FIG. 8 is a schematic illustration of a radioactivity analyzing apparatus according to the third embodiment of the present invention. The radioactivity analyzing apparatus 300 has the same elements as the radioactivity analyzing apparatus 200 except for the operation of the inverse-problem operator 13. In the third embodiment, the deterioration level is fed back from the deterioration detector 15 to the inverse-problem operator 13 as indicated in FIG. 8 by an arrow and the inverse-problem operator 13 is arranged to generate the energy spectrum using three-dimensional response function where the deterioration level from the deterioration detector 15 is added thereto.

As described with reference to FIGS. 5 and 7, the extracted pulse-height distribution generally varies due to aging deterioration of the radiation detector 2, resulting in that the inverse problem may not be potentially solved by the inverse-problem operator 13 in an accurate manner. This lessens the accuracy in the computation of the deterioration level and the identification and quantitative analysis of the radionuclide.

Figure 9:
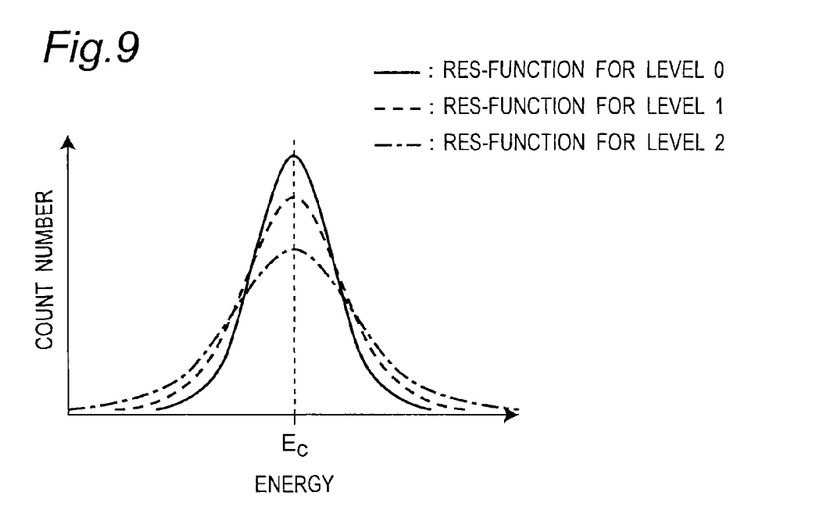
FIG. 9 is a graph illustrating a response function depending on a deterioration level.

FIG. 9 is a graph illustrating the response function depending on the deterioration level. In the third embodiment, the response-function operator 14 is arranged to generate a three-dimensional response function R with parameters such as the charge amount L, the incident radiation energy E and the deterioration level D and outputs in response to the request from the inverse-problem operator 13. The three-dimensional response function R varies depending on the deterioration level and in compliance with the energy resolution corresponding to the deterioration state of the radiation detector 2. As described in the first embodiment, the response function depending on the deterioration level may be generated using the combination of the radiation behavior analysis using Monte Carlo transport computational code such as EGS5 and the light behavior analysis in compliance with the step of determining the energy resolution.

In case where the radiation detector 2 is in a form of the scintillation detector, the light behavior analysis where the behavior of the scintillation light is analyzed after being generated before reaching the photocathode to be converted to electrons may be performed in compliance with the deterioration level. The scintillation detector can be subject to the color change and/or deliquescence of the scintillation crystal. This lessons a luminous efficacy of the crystal, resulting in a less amount of scintillation light reaching the photocathode. Thus, the response function depending on the deterioration level can be generated with the light behavior analysis by determining a variation in the amount of the scintillation light reaching the photocathode with respect to a factor of deterioration such as a lessened luminous efficacy of the crystal and comparing the variation to the deterioration level.

Figure 10:
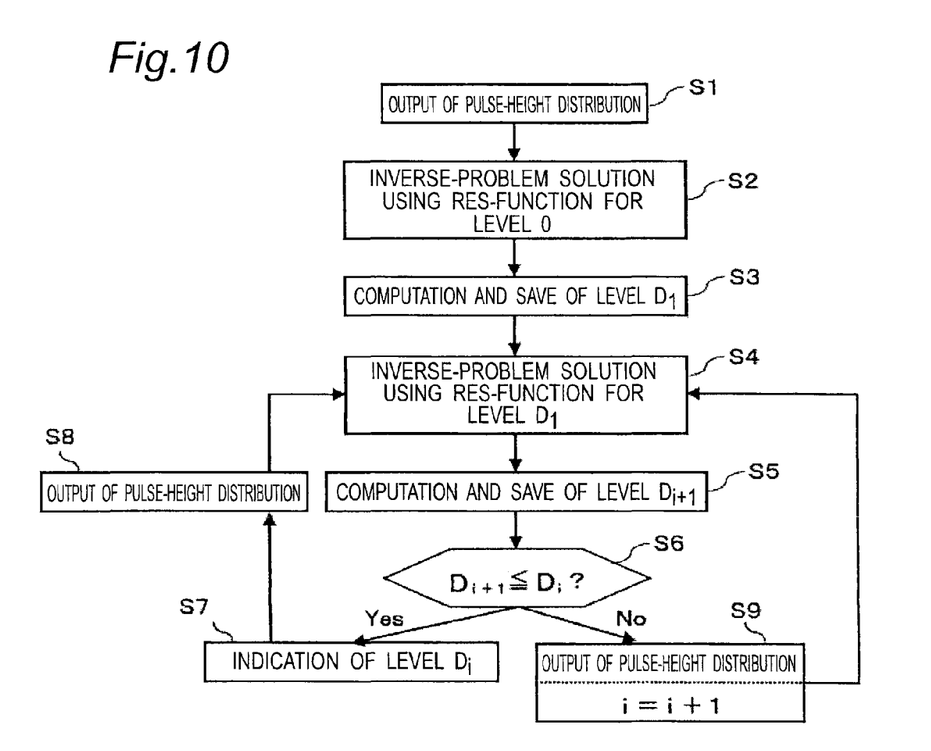
FIG. 10 is a flow chart showing a computing method of a deterioration level in the third embodiment of the present invention.

A method for computing the deterioration level according to the third embodiment will be described with reference to the flow chart of FIG. 10. In step S1, the pulse-height distribution extracted by the pulse-height analyzer 12 is transmitted to the inverse-problem operator 13. In step S2, a response function (res-function) for deterioration level 0 shown in FIG. 9 is retrieved from the response-function operator 14 and is used to compute an inverse problem by the inverse-problem operator 13. The extracted energy spectrum is transmitted to the deterioration detector 15 and the auto-compensator 19. In the third embodiment, the auto-compensator 19 executes the same processing as that in the second embodiment.

Figure 11A:
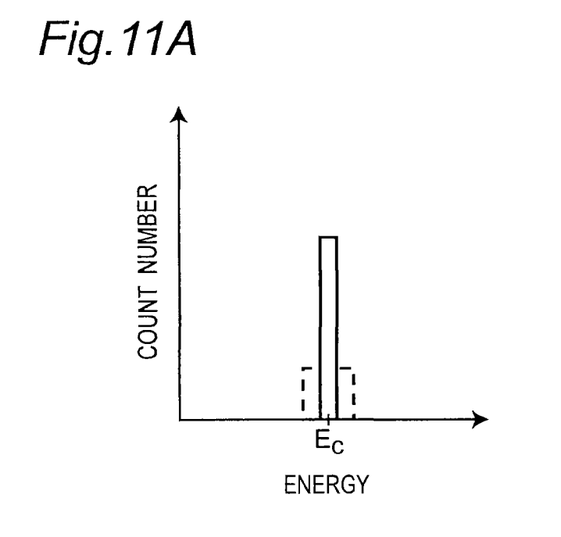
FIG. 11A-11B are charts illustrating energy spectra extracted from the same pulse-height distribution using response functions depending on different deterioration levels.

In step S3, the deterioration level is generated based on the noises indicated by the dashed line in FIG. 11A appeared in the energy spectrum by the deterioration detector 15 using the same method as described in the first embodiment. The generated deterioration level $D_1$ is transmitted to the inverse-problem operator 13 and may be stored in the memory connected to the microprocessor which is a component of the deterioration detector 15.

Figure 11B:
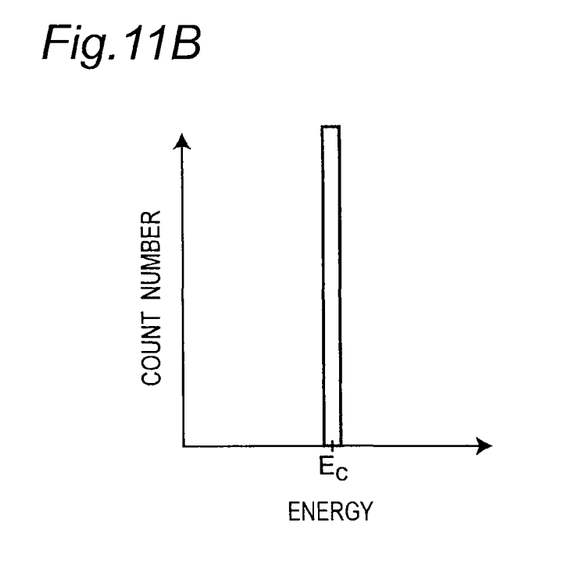

In step S4, a response function for the input deterioration level $D_1$ ($D_1$ in FIG. 10) is retrieved from the response-function operator 14 to solve the inverse problem and in turn the extracted energy spectrum is again transmitted to the deterioration detector 15 and the auto-compensator 19 by the inverse-problem operator 13. In this step S4, the response function used to solve the inverse problem is in compliance with the deterioration state of the radiation detector 2. This results in less noise appeared in the energy spectrum which is the result of the inverse-problem solution as shown in FIG. 11B. The fact that the deterioration level is divided into more stages means that the response function is better adapted to the deterioration state of the radiation detector 2, thereby generating less noise.

In step S5, the deterioration level is again computed based on the noise generated in the energy spectrum to estimate the deterioration state of the radiation detector 2 by the deterioration detector 15. The currently generated noise has an amount less than that in the previously extracted energy spectrum, which results in deterioration level $D_2$ ($D_{i+1}$ in FIG. 10) which is lower than the previously computed one.

In step S6, the currently computed deterioration level. $D_2$ is compared with the previously computed $D_1$, and confirmed to be lower than it, and transmitted to the inverse-problem operator 13 by the deterioration detector 15.

In step S7, deterioration level $D_1$ is transmitted to the display 18. In the third embodiment, the display 18 executes the same processing as described in the first embodiment. In the subsequent detection, the response function for deterioration level $D_1$ is used for the inverse-problem solution on the pulse-height distribution transmitted to the inverse-problem operator 13 in step S8.

The currently computed deterioration level $D_2$ can become larger than the previously computed deterioration level $D_1$ in step S6 when the radiation detector 2 substantially deteriorates after steps S4 to S8 are repeatedly performed. In this case, step S9 is performed and then the inverse-problem solution using the response function $D_2$ is performed in step S4. Deterioration level $D_3$ is in turn computed and stored in step S5, which is compared with the previously computed $D_2$ in step S6.

In the third embodiment, steps S4 to S9 are repeated depending on use of the radiation detector 2, which results in the optimal response function used for the inverse-problem solution in compliance with the deterioration state of the radiation detector 2.

According to the radioactivity analyzing apparatus 300 of the third embodiment, where the inverse-problem operator 13, the deterioration detector 15 and the response-function operator 14 are used to select the response function depending on the deterioration state of the radiation detector 2, the following advantage is achieved over the apparatus 200 of the second embodiment: the inverse problem is solved in an accurate manner, thereby ensuring high analysis accuracy in the computation of the deterioration level by the deterioration detector 15 and the identification and quantitative analysis of the radionuclide by the quantitative radionuclide analyzer 16.

Figure 12:
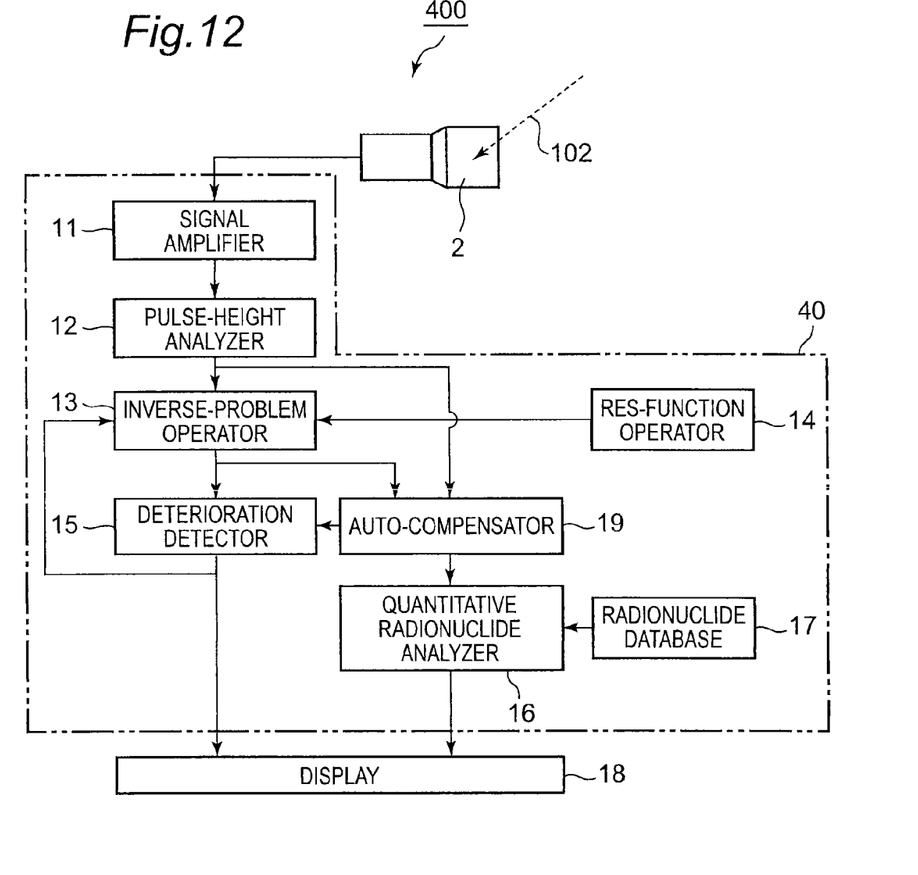
FIG. 12 is a schematic illustration of a radioactivity analyzing apparatus according to the fourth embodiment of the present invention.

FIG. 12 is a schematic illustration of a radioactivity analyzing apparatus according to the fourth embodiment of the present invention. The radioactivity analyzing apparatus 400 has the same elements as the radioactivity analyzing apparatus 300 except that the apparatus 400 does not include the shield body 3.

The absence of the shield body 3 in the radioactivity analyzing apparatus 400 causes a natural radiation 102 to impinge on the radiation detector 2. Thus, the energy spectrum output from the inverse-problem operator 13 may include spectral components due to the absorbed natural radiation 102 emitted from one or more of natural radionuclides listed in FIG. 13.

Figure 13:
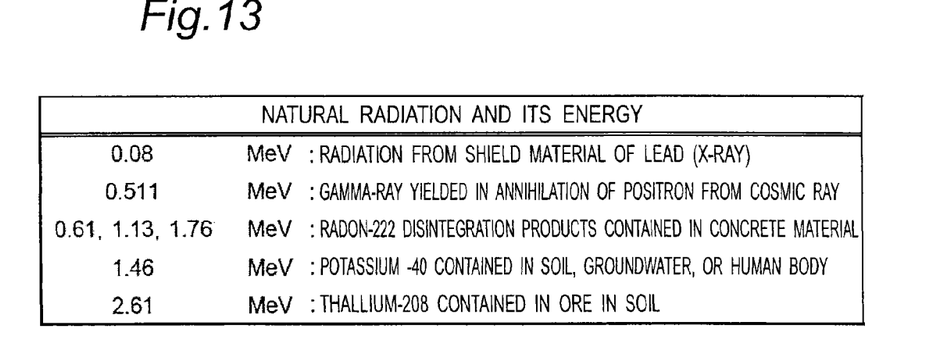
FIG. 13 is a list of major natural radionuclides.

For example, Potassium-40, which is one of natural radionuclides, emits a radiation of about 1.46 MeV. Advantageously, there are few natural radionuclides in a normal environment which emit a radiation having energy close to the above energy. Thus, a prominent component may appear due to the radiation emitted by Potassium-40 in the energy spectrum extracted by the inverse-problem operator 13. This allows the same processing as those of the above embodiments to be executed.

According to the radioactivity analyzing apparatus 400 of the fourth embodiment, where the radioactive material for calibration which emits a radiation having a given energy should be prepared before practical use of the radiation detector to make the connection between the pulse height (or the pulse-height distribution) and the radiation energy, the following advantage is achieved over the apparatus 300 of the third embodiment: the natural radionuclide such as Potassium-40 can be used to perform this energy calibration, which eliminates the need for the radioactive material for calibration.

Further, the functions of the deterioration detector 15 and the auto-compensator 19 can be constantly fulfilled, thereby constantly compensating the variation of the signal amplifying factor of the pulse signal due to aging deterioration of the radiation detector 2 and thus maintaining constant analysis accuracy.

Further, the absence of the shield body 3 reduces the total weight of the radioactivity analyzing apparatus 400. For example, while the radioactivity analyzing apparatus where the shield body is typically made of lead has a total weight of 2000 kg, the apparatus 400 which does not include the shield body has less total weight of 100 kg or below In the above embodiments, the radiation detector 2 generating a pulse output of the radioactivity analyzing apparatus is illustrated in a form of the scintillation detector, but other type of radiation detectors including the semiconductor detector based on Ge, Si or CdZnTe or the Geiger-Muller counter may be also employed.

DESCRIPTION OF REFERENCE SYMBOLS 1 sample material
2 radiation detector
3 shield body
10, 20 30 radiation analyzer
11 signal amplifier
12 pulse-height analyzer
13 inverse-problem operator
14 response-function operator
15 deterioration detector 16 quantitative radionuclide analyzer
17 radionuclide database
18 display
19 auto-compensator
100, 200, 300, 400 radioactivity analyzing apparatus
101 radiation emitted from the sample material
102 natural radiation

The invention claimed is:

1. A radioactivity analyzing apparatus for analyzing a radionuclide contained in a sample material, comprising:
   a radiation detector that detects a radiation to be detected emitted from a sample material; and
   a radiation analyzer configured to analyze the radiation based on an output from the radiation detector, the radiation analyzer including
   a pulse-height analyzer configured to extract a pulse-height distribution from a pulse signal depending on the radiation, the pulse signal being output from the radiation detector,
   an inverse-problem operator configured to perform an inverse-problem solution of the pulse-height distribution based on a response function of the radiation detector to extract an energy spectrum of the radiation, and
   a deterioration detector configured to determine a deterioration level in accordance with a deterioration state of the radiation detector based on a noise-generation ratio in the extracted energy spectrum,
   wherein the noise-generation ratio is defined as a ratio of the integrated count number in a certain energy region other than an energy region of interest included in a predetermined noise integration range, to the integrated count number in the energy region of interest.

2. The radioactivity analyzing apparatus according to claim 1, wherein the deterioration detector determines the deterioration state by analyzing noise appeared in the extracted energy spectrum.

3. The radioactivity analyzing apparatus according to claim 1, the radiation analyzer further including an auto-compensator for compensating a variation of an amplification factor in the pulse signal, wherein the auto-compensator shifts the extracted energy spectrum along its energy axis as a function of an amplifying-factor variation calculated based on the pulse-height distribution.

4. The radioactivity analyzing apparatus according to claim 1, the radiation analyzer further including a response-function operator configured to generate the response function of the radiation detector based on the deterioration level determined by the deterioration detector.

5. The radioactivity analyzing apparatus according to claim 4, wherein the radiation detector is a scintillation detector including a radiation-detection element which receives the radiation to generate a scintillation light and a photoelectric-conversion element in which photoelectric conversion is performed on the scintillation light, and wherein the response-function operator generates the response function based on:
   a radiation behavior analysis for the radiation after being emitted from the radionuclide and before being irradiated to the radiation-detection element to apply energy thereto.

6. The radioactivity analyzing apparatus according to claim 4, the radiation detector further including a radiation-detection element which receives the radiation to generate charge carriers by the ionization effect, wherein the response-function operator generates the response function based on:
   a radiation behavior analysis for the radiation after being emitted from the radionuclide and before being irradiated to the radiation-detection element to apply energy thereto; and/or
   a combination of the radiation behavior analysis and a generation process analysis for the charge carriers in the radiation-detection element.

7. The radioactivity analyzing apparatus according to claim 1, wherein a correlation between the pulse-height distribution and the radiation energy is calibrated based on natural radiation that comes from a material for calibration emitting a radiation having a given energy and that is detected by the radiation detector.

8. The radioactivity analyzing apparatus according to claim 1, the radiation analyzer further including a quantitative radionuclide analyzer configured to perform an identification and/or quantitative analysis of the radionuclide contained in the sample material based on the output from the inverse-problem operator.

9. The radioactivity analyzing apparatus according to claim 1, further comprising a display for indicating an exchange time when the radiation detector should be replaced.

10. The radioactivity analyzing apparatus according to claim 5, wherein the response-function operator generates the response function based on:
    in addition to the radiation behavior analysis, a light behavior analysis for the scintillation light after being generated at the radiation-detection element before reaching the photoelectric-conversion element to get converted to energy.

* * * * *